(12) United States Patent
Gibbons et al.

(10) Patent No.: US 8,029,664 B2
(45) Date of Patent: Oct. 4, 2011

(54) WASH FILTER WITH WASH VELOCITY CONTROL CONE

(75) Inventors: Kevin Gibbons, Torrington, CT (US); Francis P. Marocchini, Somers, CT (US); Tomas R. Leutwiler, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 12/146,562

(22) Filed: Jun. 26, 2008

(65) Prior Publication Data
US 2009/0321334 A1   Dec. 31, 2009

(51) Int. Cl.
B01D 35/157 (2006.01)
B01D 35/02 (2006.01)
B01D 29/00 (2006.01)
B01D 29/88 (2006.01)

(52) U.S. Cl. ............ 210/137; 210/409; 210/416.4; 210/428; 210/429; 210/430; 210/433.1; 210/497.3

(58) Field of Classification Search ............ 210/409, 210/416.4, 433.1, 497.3, 117, 118, 428, 429, 210/430
See application file for complete search history.

(56) References Cited

U.S. PATENT DOCUMENTS

| 383,901 A | 6/1888 | Neu |
|---|---|---|
| 686,942 A | 11/1901 | Hegarat |
| 1,518,894 A | 12/1924 | Bliss |
| 2,969,808 A | 1/1961 | Horlacher |
| 3,039,988 A | 6/1962 | Trinkler |
| 3,109,809 A | 11/1963 | Verrando, Jr. |
| 3,193,102 A * | 7/1965 | Bottoms et al. ............... 210/137 |
| 3,422,956 A | 1/1969 | Hadden |
| 3,622,004 A | 11/1971 | Meyer |
| 3,942,327 A | 3/1976 | Noe |
| 3,967,533 A | 7/1976 | Tyler |
| 4,011,891 A | 3/1977 | Knutson et al. |
| 4,033,233 A | 7/1977 | Toi |
| 4,177,713 A | 12/1979 | Lewis et al. |
| 4,335,645 A | 6/1982 | Leonard |
| 4,365,770 A | 12/1982 | Mard et al. |
| 4,383,647 A | 5/1983 | Woodruff et al. |
| 4,450,753 A | 5/1984 | Basrai et al. |
| 4,505,108 A | 3/1985 | Woodruff et al. |
| 4,545,198 A | 10/1985 | Yoshida |
| 4,807,517 A | 2/1989 | Daeschner |
| 5,014,667 A | 5/1991 | Meyer |
| 5,179,888 A | 1/1993 | Schendel et al. |

(Continued)

FOREIGN PATENT DOCUMENTS

EP      1054161      11/2000

(Continued)

OTHER PUBLICATIONS

European Search Report for Application No. 09251020.5-2113 dated Jun. 15, 2009.

*Primary Examiner* — Nam Nguyen
*Assistant Examiner* — Paul J Durand
(74) *Attorney, Agent, or Firm* — Carlson Gaskey & Olds PC

(57) ABSTRACT

A variable wash flow filter assembly includes a wash velocity control cone movable between a minimal position and a maximum position.

1 Claim, 8 Drawing Sheets

U.S. PATENT DOCUMENTS

| | | |
|---|---|---|
| 5,209,058 A | 5/1993 | Sparks et al. |
| 5,346,360 A | 9/1994 | Cooper |
| 5,735,122 A | 4/1998 | Gibbons |
| 5,735,503 A | 4/1998 | Hietkamp |
| 5,899,064 A | 5/1999 | Cheung |
| 5,938,124 A | 8/1999 | Lowi, Jr. |
| 5,997,431 A | 12/1999 | Vukovich et al. |
| 6,142,416 A | 11/2000 | Markstein et al. |
| 6,402,487 B1 | 6/2002 | Clements et al. |
| 6,655,151 B2 | 12/2003 | Mahoney et al. |
| 6,751,942 B2 | 6/2004 | Mahoney et al. |
| 6,851,929 B2 | 2/2005 | Goldberg |
| 6,863,704 B2 | 3/2005 | Pillion et al. |
| 6,886,665 B2 | 5/2005 | Parsons et al. |
| 6,955,113 B2 | 10/2005 | Demers |
| 6,957,569 B1 | 10/2005 | Napier et al. |
| 6,981,359 B2 | 1/2006 | Wernberg et al. |
| 7,096,658 B2 | 8/2006 | Wernberg et al. |
| 7,174,273 B2 | 2/2007 | Goldberg |
| 7,216,487 B2 | 5/2007 | Parsons |
| 7,237,535 B2 | 7/2007 | Eick et al. |
| 7,273,507 B2 | 9/2007 | Schwalm |

FOREIGN PATENT DOCUMENTS

| | | |
|---|---|---|
| GB | 1445680 | 8/1976 |
| WO | 2008063869 | 5/2008 |

\* cited by examiner

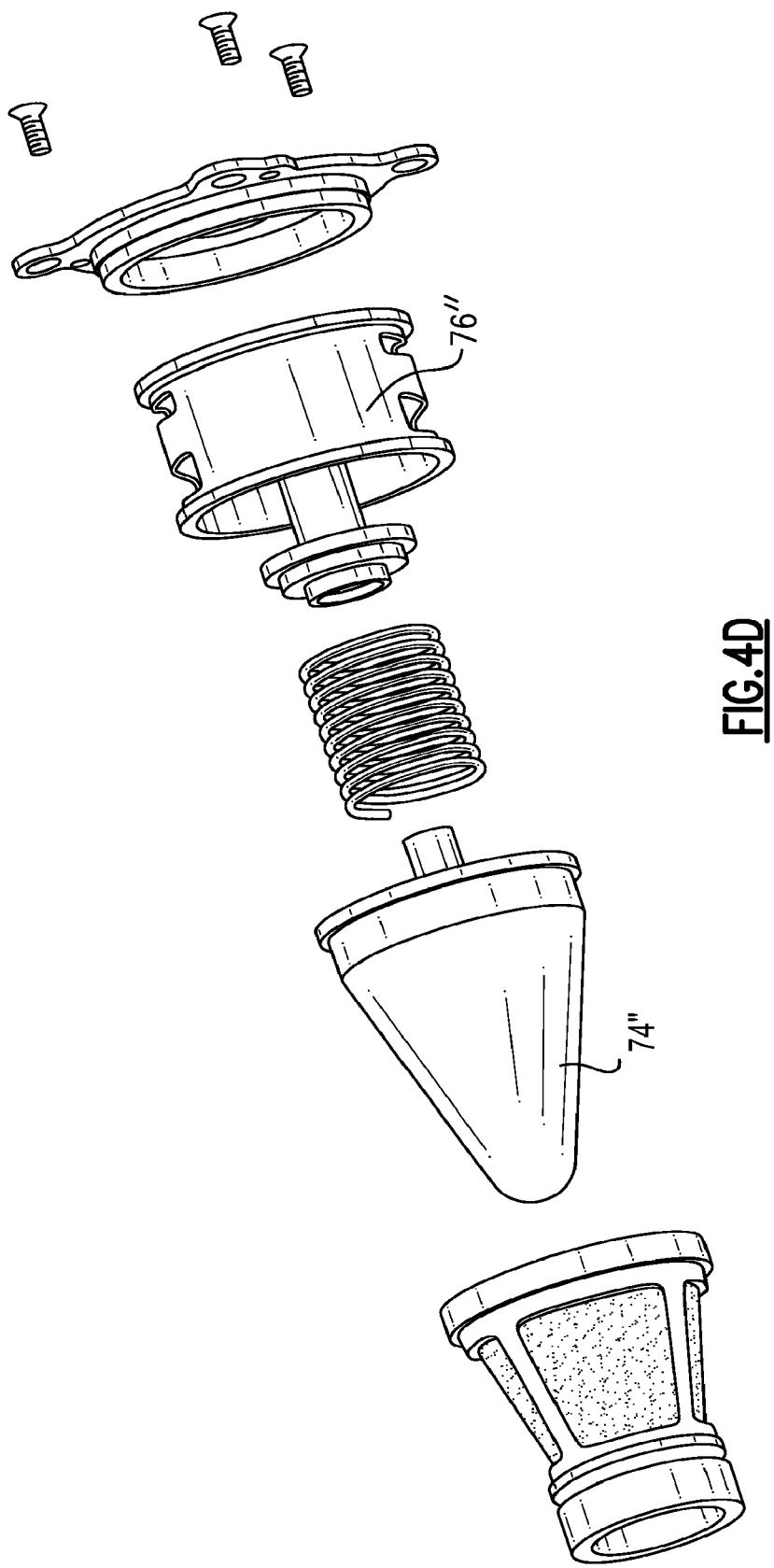

WASH FILTER WITH WASH VELOCITY CONTROL CONE

RESEARCH OR DEVELOPMENT

This invention was made with Government support under N00019-02-C-3003 awarded by The United States Air Force. The Government has certain rights in this invention.

BACKGROUND

The present invention relates to a filtering system and more particularly to a wash filter therefor.

Engine systems often contain contamination sensitive components. These components are sensitive to contamination and require a filtration system which protects the clearances against contamination within the fuel.

Pumps that supply pressure and flow are typically fixed displacement pumps—that is, the flow varies linearly with speed. During steady-state operation, excess pump flow is bypassed and recirculated. Conventional fixed geometry wash filters utilize this excess flow as wash flow. The range of wash flow over the pump operating envelope supplies sufficient washing action to clean a traditional wash filter filtration system.

SUMMARY

A variable wash flow filter assembly according to an exemplary aspect of the present invention includes: a housing which defines an inlet, at least one filtered flow port, and at least one outlet port; a wash filter within the housing adjacent to at least one filtered flow port; and a wash velocity control cone biased within the housing relative to the wash filter, the wash velocity control cone is movable between a minimal position and a maximum position.

A fuel system according to an exemplary aspect of the present invention includes: a main fuel pump; and a variable wash flow filter assembly in fluid communication with the main fuel pump. The variable wash flow filter assembly comprises a wash velocity control cone movable relative to a wash filter, the wash velocity control cone movable between a minimal position and a maximum position to split a fuel flow from the fuel pump into thru flow to the demand system and a filtered flow. The thru flow serves as a wash flow to carry away contaminate trapped by the wash filter within said variable wash flow filter assembly.

A method of filtering a fuel flow according to an exemplary aspect of the present invention includes: biasing a wash velocity control cone relative to a wash filter within a variable wash flow filter assembly the wash velocity control cone movable between a minimal position and a maximum position, the variable wash flow filter assembly splits inlet flow into a thru flow to a demand system and a filtered flow. The thru flow operable as a wash flow to carry away contaminate trapped by the wash filter within the variable wash flow filter assembly.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows:

FIG. 4D is an exploded view of the variable wash flow filter assembly, with axial exit of FIG. 4A.

DETAILED DESCRIPTION OF THE EXEMPLARY EMBODIMENTS

Figure 1:
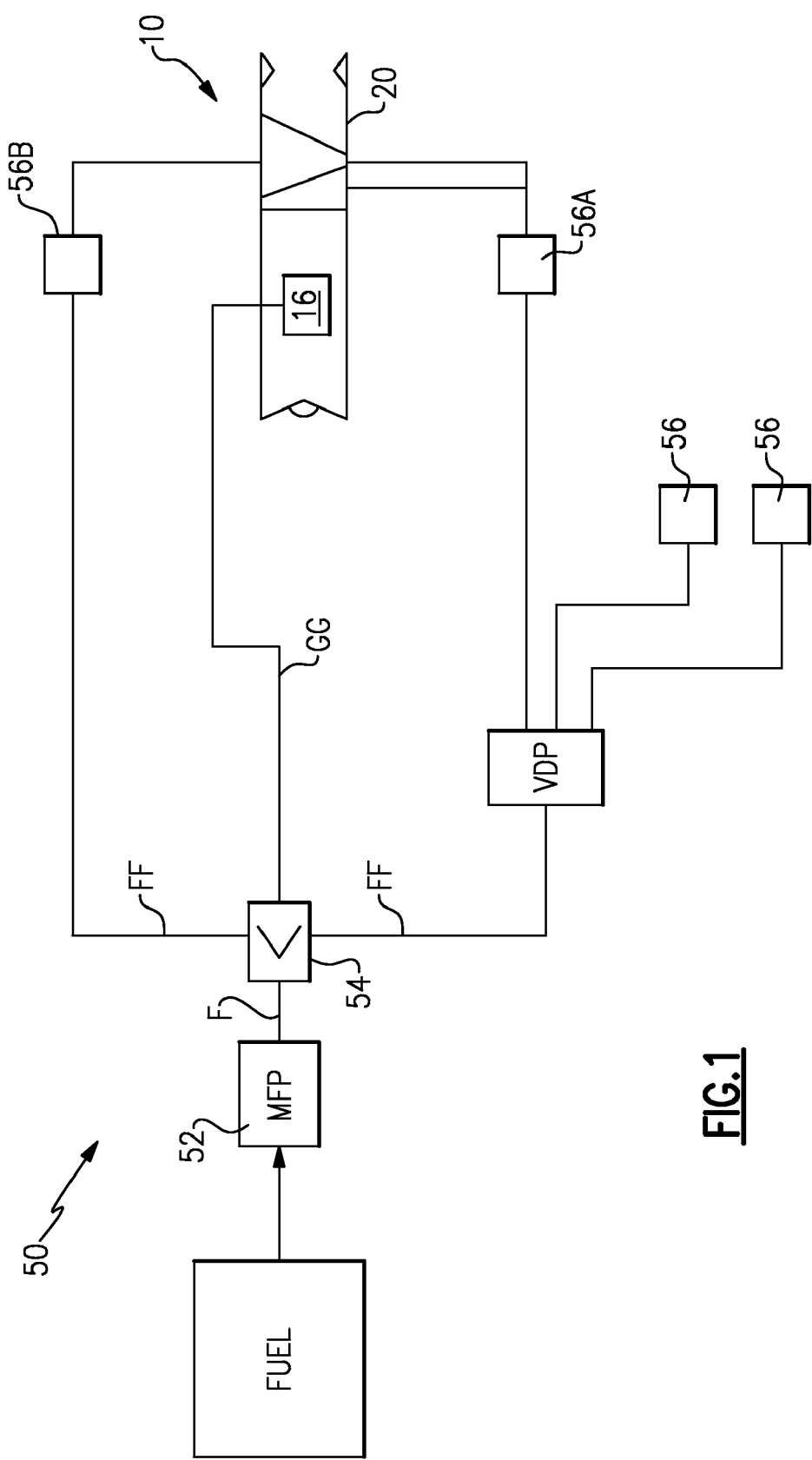
FIG. 1 is a schematic view of a fuel system.

FIG. 1 illustrates a schematic of a fuel system 50 that would utilize a Variable wash flow filter assembly 54. The fuel system 50 generally includes a main fuel pump 52 which communicates a fuel flow F from an outlet thereof through a variable wash flow filter assembly 54. The fuel flow F from the variable wash flow filter assembly 54 is split between a burn flow GG and a filtered flow FF. The filtered flow FF and/or the burn flow GG may exit the variable wash flow filter assembly 54 in a radial (FIG. 2A) or axial flow (FIG. 4A) path. The filtered flow FF is communicated to a multiple of contaminates sensitive components 56. Furthermore, it should be understood that the variable wash flow filter assembly 54 may be used in systems other than gas turbine engines.

As the filtered flow FF supplies only the flow required for contaminate sensitive devices 56, there is no excess flow to supply wash flow within the variable wash flow filter assembly 54. The burn flow GG is thereby utilized as the wash flow, however, the burn flow GG may have a relatively high "turn down ratio" or the ratio of max flow to min flow. This high turn down ratio would not allow a conventional fixed geometry wash filter to meet a standard wash velocity range for a fixed geometry wash filter. The variable wash flow filter assembly 54 maintains the wash velocity within a desired range for effective operation.

Figure 2A:
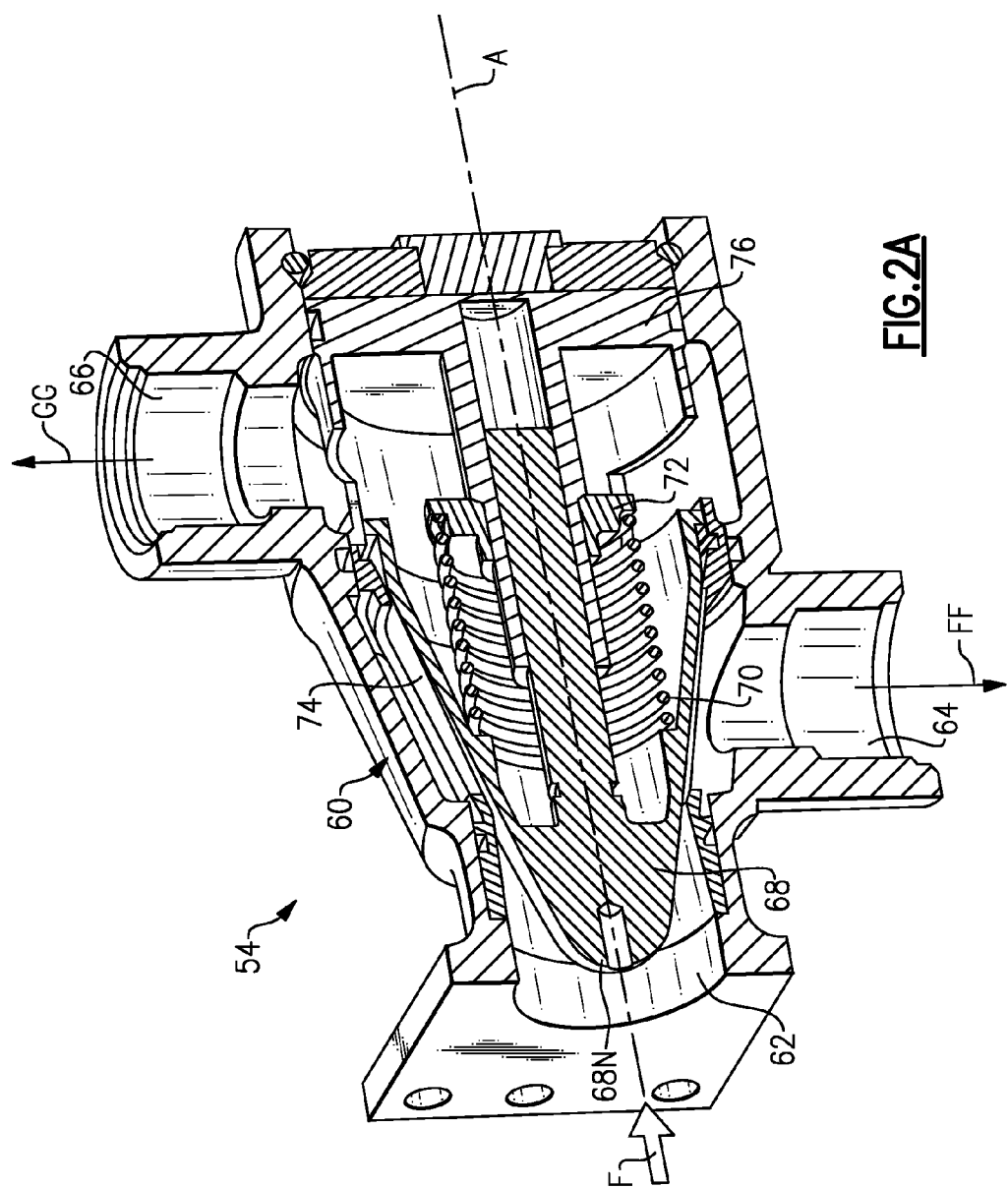
FIG. 2A is a perspective cross sectional view of a variable wash flow filter assembly.
Figure 2B:
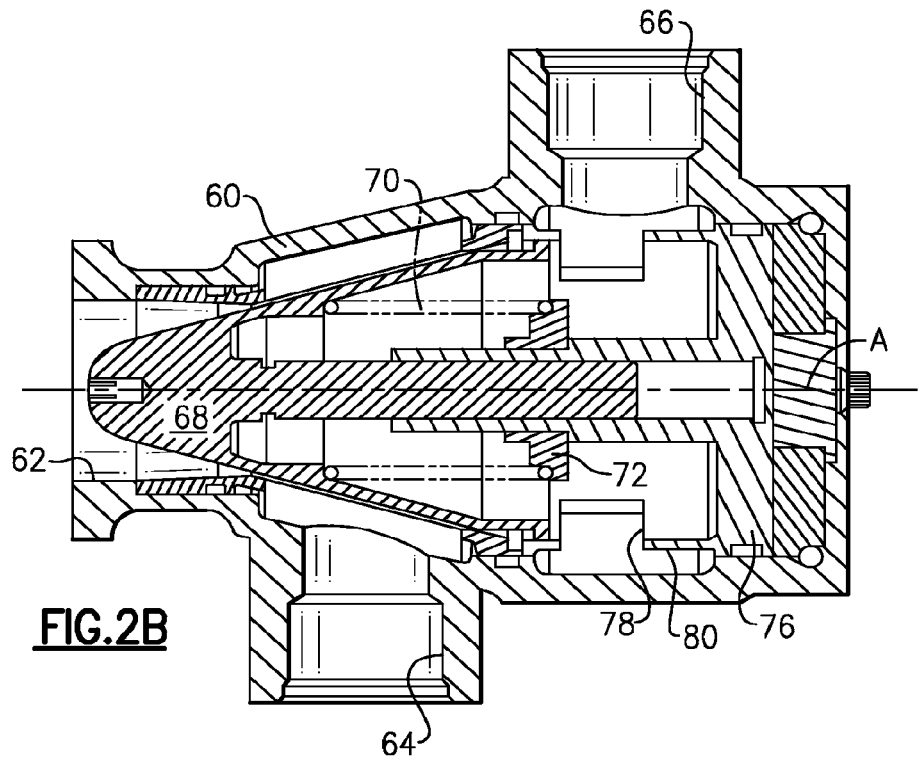
FIG. 2B is a cross sectional view of the variable wash flow filter assembly, with radial exit, of FIG. 2A in a first position.
Figure 2C:
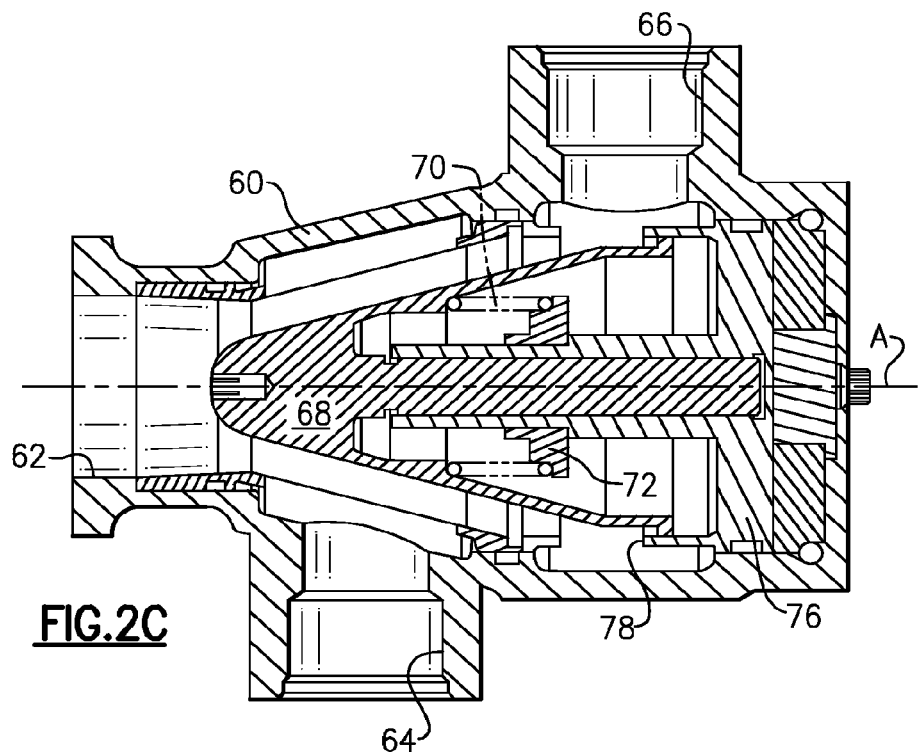
FIG. 2C is a cross sectional view of the variable wash flow filter assembly, with radial exit, of FIG. 2A in a second position.
Figure 2D:
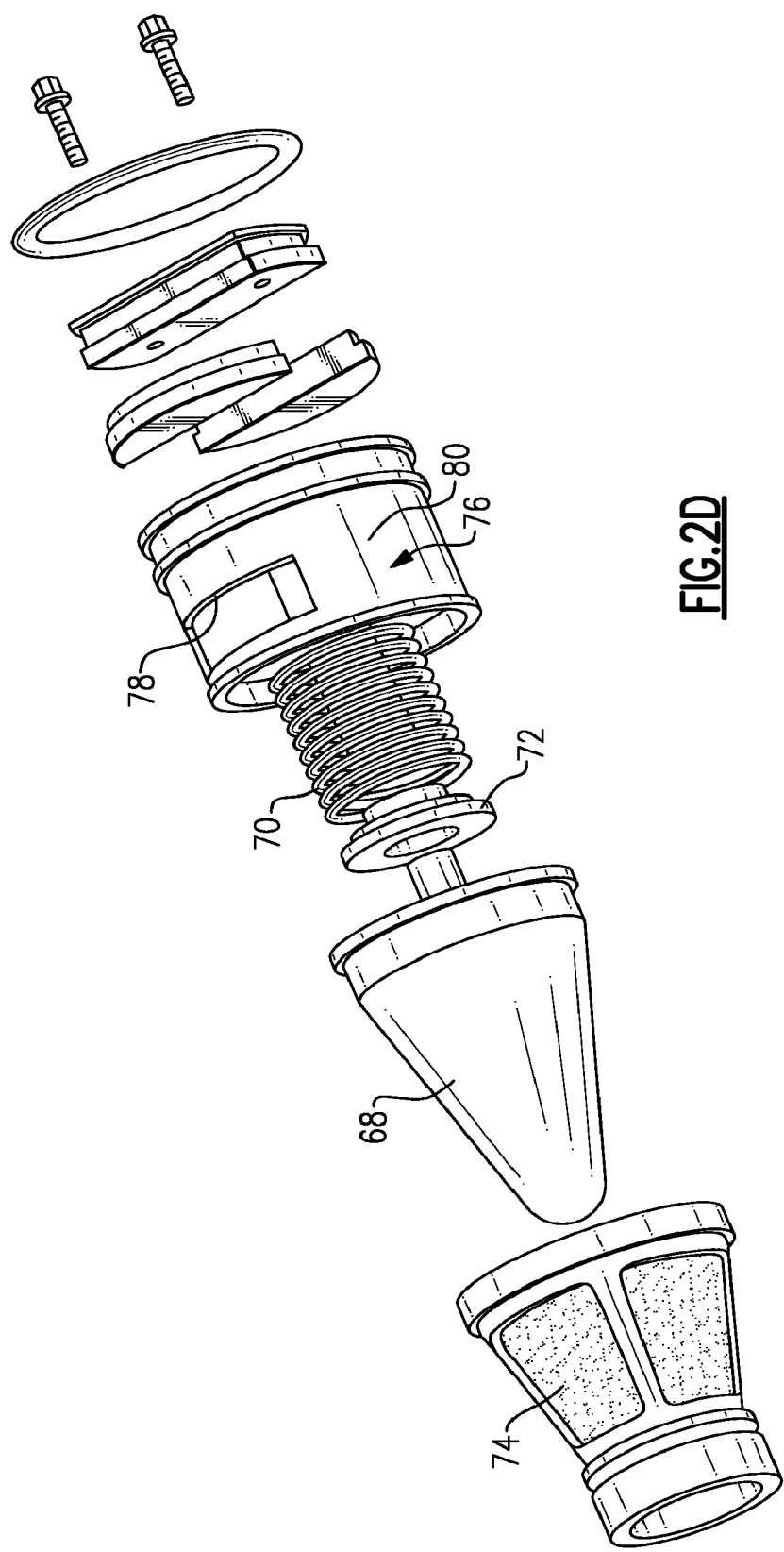
FIG. 2D is an exploded view of the components in the variable wash flow filter assembly, with radial exit, of FIG. 2A.

Referring to FIG. 2A, the variable wash flow filter assembly 54 includes a housing 60 which defines an inlet 62, at least one filtered flow FF port 64, and at least one thru flow GG port 66 (also illustrated in FIG. 2B). A wash velocity control cone 68 is biased within the housing 62 with a bias member 70 such as a spring to move between a minimal position (FIG. 2B) and a maximum position (FIG. 2C). The wash velocity control cone 68 defines a rounded nose section 68N along said axis A. The bias member 70 reacts against a spring seat 72 mounted to a guide 76. The guide 76 guides the wash velocity control cone 68 for axial movement along an axis A of the variable wash flow filter assembly 54.

The wash filter 74 is of conical shape to receive the wash velocity control cone 68 which has a generally equivalent shape such that, at the minimum position (FIG. 2B), a small gap is maintained between the wash velocity control cone 68 and the wash filter 74. This controlled minimum gap corresponds to a low flow condition in which the minimum gap provides sufficient wash velocity to carry away contaminate trapped by the wash filter 74. As flow from the fuel pump 52 increases, pressure drop and flow momentum forces on the wash velocity control cone 68 change. The wash velocity control cone 68 strokes against the bias member 70 to settle at a position where the flow and pressure forces are in balance. In this manner, movement of the wash velocity control cone 68 will increase the gap between the wash velocity control cone 68 and the wash filter 74 in proportion to the flow from the fuel pump in response to, for example, an increase in either demand flow or filtered flow. This movement and the variable gap maintain a relatively constant wash velocity to assure that contaminate trapped by the wash filter 74 will be carried away with the demand flow GG.

The gap between the wash velocity control cone 68 and the wash filter 74 has a relatively high fluid velocity which may causes a drop in the static fluid pressure that may result in a closing pressure load and a net closing force on the wash velocity control cone 68. To avoid this potential closing force, at least one deltaP window 78 is located within the guide 76 downstream of the conical gap between the wash velocity control cone 68 and the wash filter 74. The window 78 may be located through a sleeve section 80 of the guide 76. One or more windows 78 may be located and contoured to optimize the deltaP for various flow conditions which provide net positive forces for controlling cone position.

Fuel flow F from the main fuel pump 52 enters the variable wash flow filter assembly 54 through the inlet 62. The fuel is guided to flow between the wash velocity control cone 68 and the wash filter 74. Movement of the wash velocity control cone 68 relative the wash filter 74 operates to vary the flow area relative to the stroke of the wash velocity control cone 68. A portion of the inlet flow will pass through the wash filter 74 and into the filtered flow FF port 64 to become filtered flow FF. The balance of the fuel becomes system demand flow and will carry away contaminate trapped by the wash filter 74. System demand flow passes essentially though the variable wash flow filter assembly 54, while the filtered flow FF is directed generally perpendicular to the axis F through the wash filter assembly 54.

Figure 3:
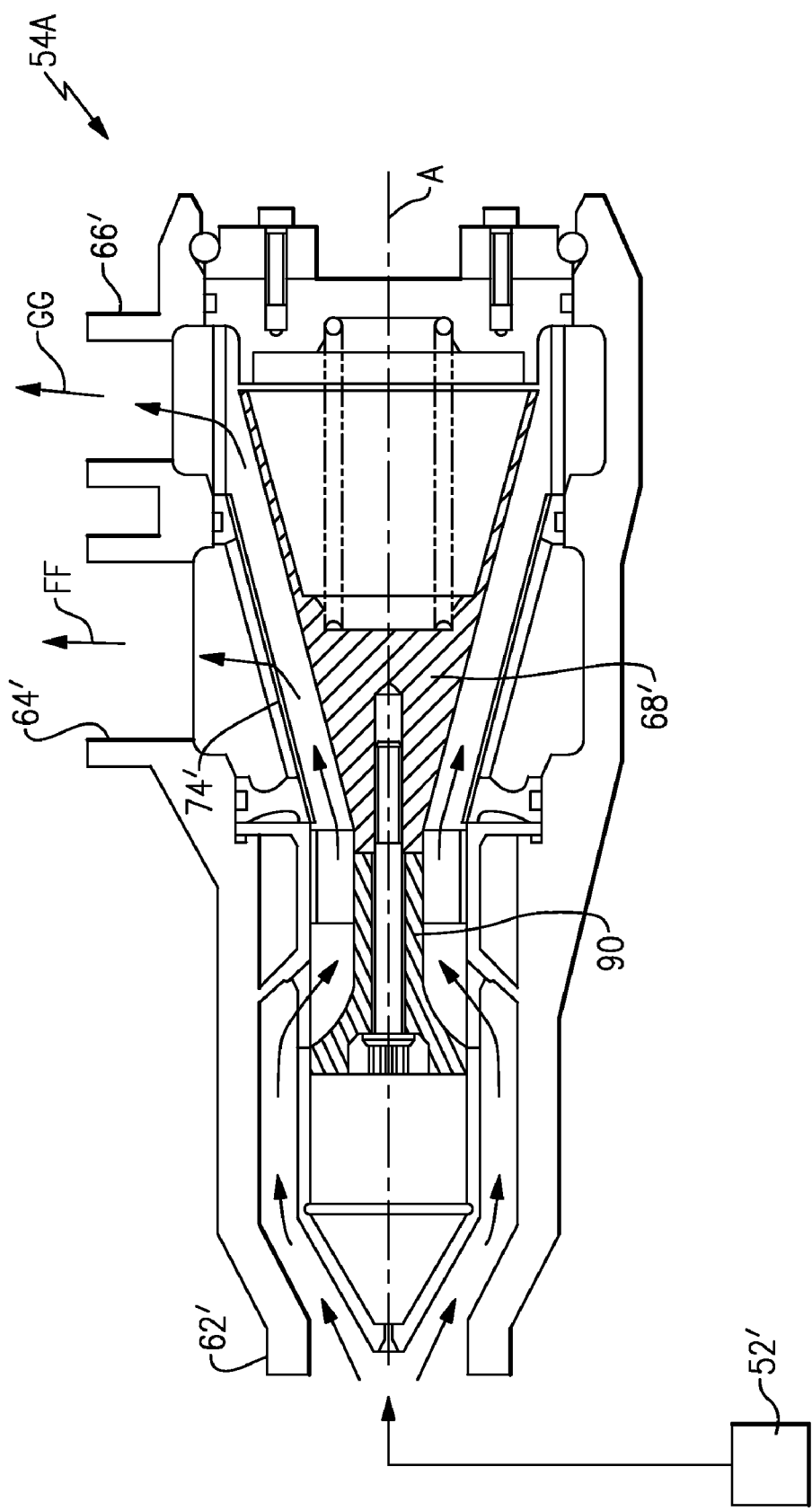
FIG. 3 is a cross sectional view of another variable wash flow filter assembly, with axial exit.

Referring to FIG. 3, another non-limiting embodiment of a variable wash flow filter assembly 54A includes a wash velocity control cone 68' that integrates the stability valve 90 thereon. That is, the wash velocity control cone 68' includes an integrated stability valve 90.

Fuel flow from the centrifugal main fuel pump 52' enters the variable wash flow filter assembly 54A through the inlet 62'. The fuel is guided through the stability valve 90 which creates the proper backpressure for stable pump operation, then flows between the wash velocity control cone 68' and the wash filter 74' as described above. The wash velocity control cone 68' that integrates the stability valve 90 are fixed together to move as a unit and therefore have the same stroke to flow relationship.

Figure 4A:
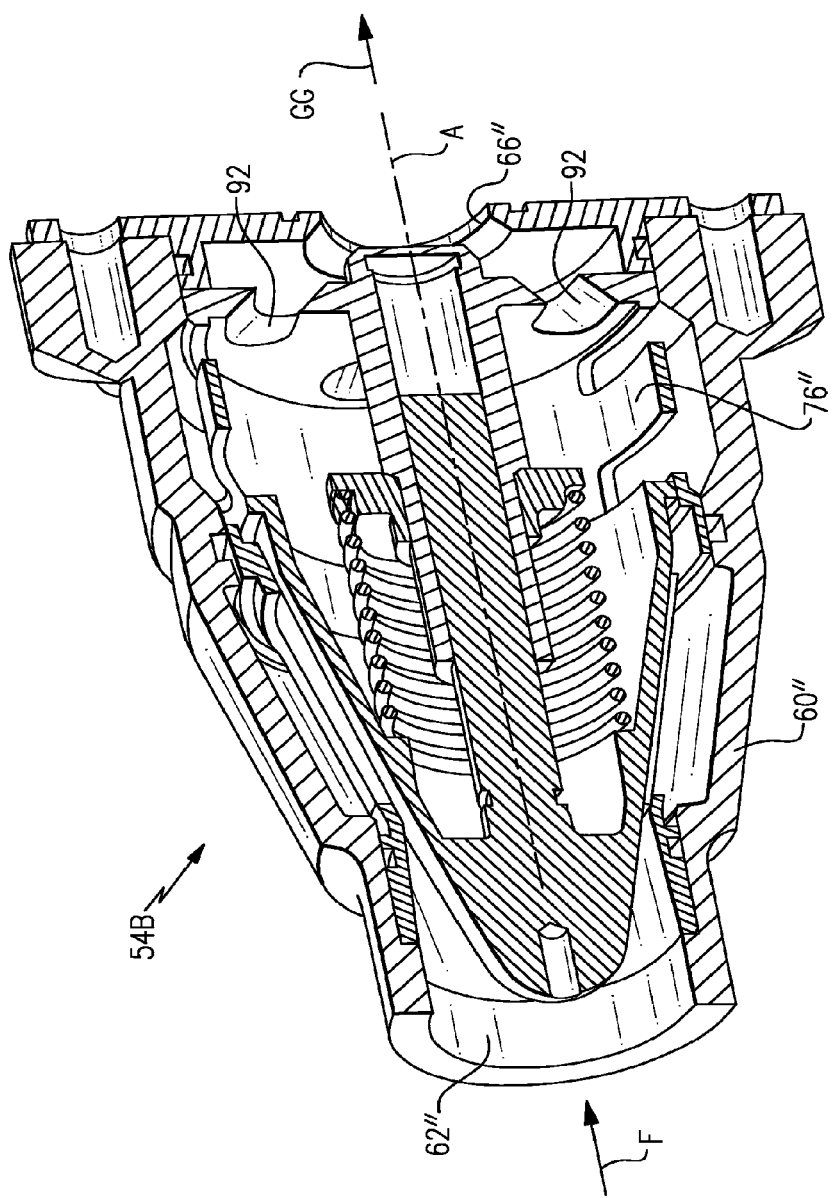
FIG. 4A is a perspective cross-sectional view of another variable wash flow filter assembly, with axial exit.
Figure 4C:
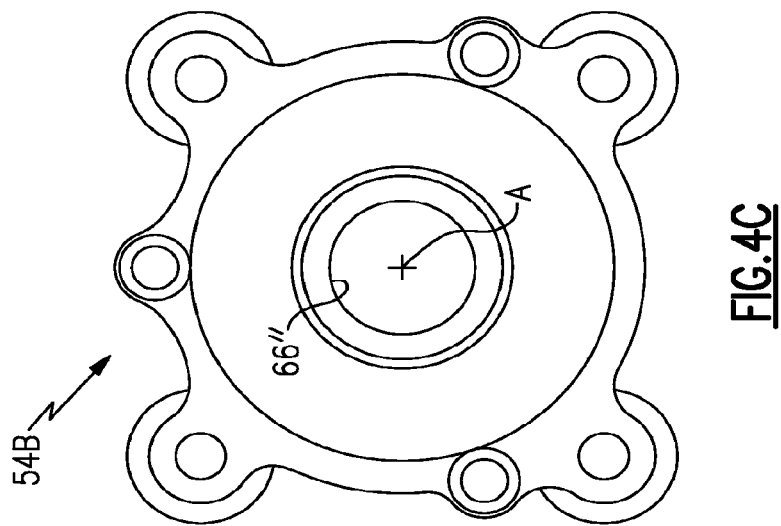
FIG. 4C is a rear view of the variable wash flow filter assembly, with axial exit of FIG. 4A.
Figure 4B:
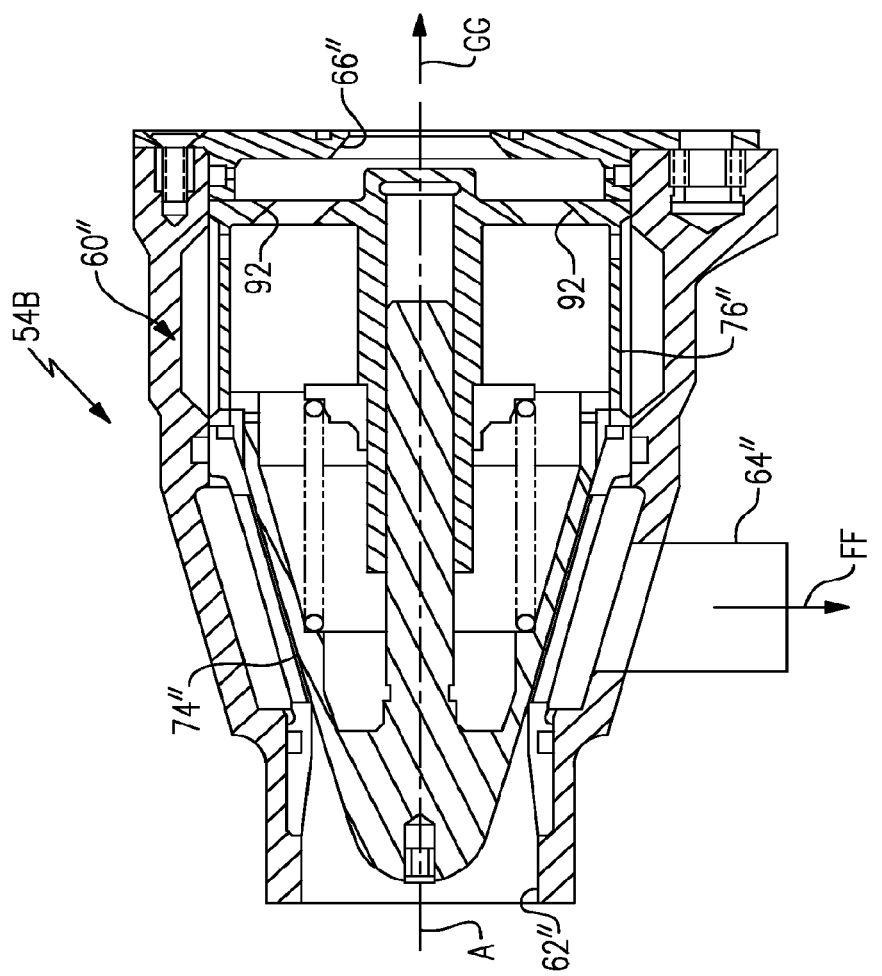
FIG. 4B is a cross-sectional view of the variable wash flow filter assembly, with axial exit of FIG. 4A.

Referring to FIG. 4A, another non-limiting embodiment of a variable wash flow filter assembly 54B includes an axial thru flow GG port 66" and a radial filter flow FF port 64" (FIG. 4B). The variable wash flow filter assembly 54B operates generally as described above with the thru flow GG being communicated through ports 92 located through a base of the guide 76" which then exits through the flow GG port 66" which is located along the axis A of the housing 60" (also shown in FIGS. 4C and 4D).

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations are possible in light of the above teachings. Non-limiting embodiments are disclosed herein, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A variable wash flow filter assembly comprising:
a housing which defines an inlet along a longitudinal axis, at least one filtered flow port, and at least one thru flow port;
a frusto-conical wash filter axially fixed within said housing adjacent to said at least one filtered flow port;
a wash velocity control cone biased relative to said housing by a bias member, said wash velocity control cone movable between a minimal position and a maximum position relative to said axially fixed wash filter to split a fuel flow through said inlet between a burn flow through said thru flow port and a filtered flow thru said filtered flow port;
a spring seat mounted to a guide fixed to said housing to react against said bias member, said guide operable to guide said wash velocity control cone along said longitudinal axis between said minimal position and said maximum position; and
a stability valve mounted to said wash velocity control cone such that fuel is guided at least partially through said stability valve to generate a backpressure, said wash velocity control cone and said stability valve fixed together to move as a unit and provide the same stroke to flow relationship.

* * * * *